United States Patent [19]
Orr et al.

[11] Patent Number: 5,835,386
[45] Date of Patent: Nov. 10, 1998

[54] METHOD FOR MANAGING STORM WATER DAMAGE

[75] Inventors: Wilson W. Orr, Mayer; Raymond M.P. Miller, Scottsdale, both of Ariz.

[73] Assignee: City of Scottsdale, Scottsdale, Ariz.

[21] Appl. No.: 900,185

[22] Filed: Jul. 25, 1997

Related U.S. Application Data

[63] Continuation-in-part of Ser. No. 735,336, Oct. 22, 1996, Pat. No. 5,652,717, which is a continuation of Ser. No. 285,830, Aug. 4, 1994, abandoned.

[51] Int. Cl.$^6$ .................................................. G06T 17/50
[52] U.S. Cl. ........................... 364/578; 395/930; 405/80
[58] Field of Search ................................. 364/578, 564, 364/512, 413.3; 324/323; 395/920, 929, 930; 422/900; 434/130, 299; 405/39, 258, 80; 73/861.63

[56] References Cited

U.S. PATENT DOCUMENTS

| | | | |
|---|---|---|---|
| 4,345,856 | 8/1982 | Tuck | 405/258 |
| 4,868,771 | 9/1989 | Quick et al. | 364/578 |
| 4,890,249 | 12/1989 | Yen | 364/578 |
| 5,005,147 | 4/1991 | Krishen et al. | 364/578 |
| 5,307,292 | 4/1994 | Brown et al. | 364/564 |
| 5,329,464 | 7/1994 | Sumic et al. | 364/512 |
| 5,342,144 | 8/1994 | McCarthy | 405/39 |
| 5,375,074 | 12/1994 | Greenberg et al. | 364/578 |
| 5,608,171 | 3/1997 | Hunter et al. | 73/861.63 |

OTHER PUBLICATIONS

"A Three–Dimensional/Stereoscopic Display and Model Control System for Great Lakes Forecasts", by C. Yen, K. Bedford, J. Kempf and R. Marshall, IEEE Visualization Conference, 1990, pp. 194–201.

"Visualizing n–Dimensional Implications of Two–Dimensional design Decisions", by S. Ervin, IEEE Visualization Conference, 1992, pp. 356–360.

"Computer–Aided Modeling for Interference Analysis in Urban Areas", by T. Mizuike et al, Globecom '92: IEEE Global Telecommunications Conference, 1992, pp. 1858–1864.

"Machine Learning from Remote Sensing Analysis", by D. Charebois, D. Goodenough and S. Matwin, IEEE, Remote Sensing for the Nineties, 1993 (IGARSS), pp. 165–172.

"ADSM—An Automated Distribution System Modeling Tool for Engineering Analyses", by X. Wei, Z. Sumic and S. Venkata, IEEE, Transmission and Distribution Conference, 1994, pp. 46–52.

"Geographic Information Systems: Are They Decision Support Systems?", by L. Murphy, IEEE, System Sciences, 1995 Annual Hawaii Int'l Conference, vol. IV, pp. 131–140.

*Primary Examiner*—Kevin J. Teska
*Assistant Examiner*—Russell W. Frejd
*Attorney, Agent, or Firm*—Cahill, Sutton & Thomas P.L.C.

[57] ABSTRACT

A method for creating a model for managing storm water is described which is capable of providing projected results and effects based upon varying the inputted data as a function of the consequences of presently made or proposed decisions by the decisionmakers. The severity of the storm event and/or the level of investment in mitigation infrastructure may be varied to view simulated, three-dimensional likely outcomes and losses. Data collected from a plurality of sources are converted into an electronic database which may be automatically and/or periodically updated. The model provided by modeling and simulation modules may be in the form of two- or three-dimensional visual presentations in an especially equipped multiple, computer-driven, projector screen room or may be in the form of a printed media for binding and distribution with screen images combined with text.

24 Claims, 4 Drawing Sheets

METHOD FOR MANAGING STORM WATER DAMAGE

CROSS-REFERENCE TO RELATED APPLICATIONS

The present application is a continuation-in-part application of an application entitled "APPARATUS AND METHOD FOR COLLECTING, ANALYZING AND PRESENTING GEOGRAPHICAL INFORMATION", filed Oct. 22, 1996 and assigned Ser. No. 08/735,336, now U.S. Pat. No. 5,652,717 issued Jul. 29, 1997, which is a continuation of application Ser. No. 08/285,830, filed Aug. 4, 1994, now abandoned, and describing an invention of the present inventors.

BACKGROUND OF THE INVENTION

1. Field of the Invention

The present invention relates to the collection, integration, manipulation, modeling, and presentation of various local, regional, and/or global data and, more particularly, to a method for managing storm water and reducing the likelihood of damage and injury due to flooding based upon such data.

2. Description of Related Art

Management of storm water is a complex, expensive, time-consuming and, essentially, manual process. It is usually the responsibility of local and regional jurisdictions having limited resources and yet there must be compliance with a variety of federally mandated requirements. Calculations of surface water runoff due to rain and other precipitation events are mathematically determined as a function of rainfall rate and runoff rates. These mathematical relationships are presented in a spreadsheet format to define the number and size of water conveying/collecting elements such as pipes, drainage courses and water collection basins. As a practical matter, the financial costs of potential losses of life and property are sought to be balanced with the costs of runoff water containment to determine a cost level acceptable to the public. Ground surface permeability is often estimated based upon use of the land as a function of its primary zoning designation. This factor is speculative and often leads to significant over or under building of flood mitigation infrastructures; this results in a haphazard matching between the costs of losses incurred and the costs expended to prevent damage. Urban development of the land invariably increases the volume of runoff water and, in combination with the velocity of the flowing water, elevates the risk and damage to life and property. Presently, the local or regional jurisdiction must attempt to match the water conveying infrastructure and the water retention basins in existence with an expected or anticipated worst case precipitation event. When these containment capacities are exceeded, emergency activities become necessary. Aside from containment of rainfall to minimize the likelihood of damage and loss of life, other burdens attendant storm water management are present. It is well known that depending upon the nature of the drainage area, pollutants, to a greater or lesser degree, will be transported by the rainwater. Such transport and control of pollutants are subject to federal regulations imposed by the Environment Protection Agency under the Non-Point Discharge Elimination System regulations. Thus, the management of storm water must include provisions for complying with pollution related federal regulations.

The management of storm water is very complex. There is a paucity of supporting data and specific technical knowledge necessary for decisions. All of these difficulties add to the expense and uncertainty of the efficacy of the decisions that have to be made and are presently being made by numerous local and regional jurisdictions. Moreover, it is well understood that significant mismatching exists between the investments made in the infrastructure for managing storm water with the mitigation of damage to property and risk of life. There presently exists no succinct methodology for creating and presenting simulations of levels of storm water management with concomitant risks to life and property.

SUMMARY OF THE INVENTION

The present invention is directed to a method for collecting data having an effect upon storm water runoff severity, correlating such data with existing hydrological models, correlating the costs for water containment infrastructures with expected losses and presenting the results in a three-dimensional image. During an actual storm water emergency, simulated scenarios can be created to assist in anticipating different flooding conditions and thereby take precautionary measures prior to loss of control and attendant emergencies thereafter arising. The present invention permits planning for various storm water conditions by being able to create various flooding scenarios portraying different flood water levels and thereby flood severity. The flood water severity can be mitigated by creating scenarios of many different types and capacities of water containment and water conduit structures correlated with attendant costs of implementing same. Such information of simulated storm water severities and optional solutions for reducing risks of loss of life and property damage permits the decisionmakers of the local or regional jurisdictions to accurately plan the extent and nature of the storm water management appropriate for the costs incurred coupled with an acceptable risk of loss of life and property damage. Numerous scenarios in two- and three-dimensional visually perceivable format can provide dramatic predictions of the extent of mitigation of flood water under present conditions and under various simulated conditions based upon simulated rainfall and/or simulated infrastructure for mitigating unwanted and damaging water runoff. Additionally, costs and affordability can be determined on a real time basis and on a projected basis as a function of the data collected relating to demographics, taxes, interest rates, and other financially relevant information.

It is therefore a primary object of the present invention to provide a method for depicting storm water damage under present and simulated scenarios.

Another object of the present invention is to provide a method for managing storm water to minimize loss of life and property damage.

Yet another object of the present invention is to provide a method for managing storm water commensurate with costs and an acceptable risk of loss of life and property damage.

Still another object of the present invention is to provide a method for simulating numerous scenarios for managing storm water by varying water containment infrastructures.

A further object of the present invention is to provide a method for short term and long term planning for storm water related events.

A yet further object of the present invention is to provide a method for creating hydrological engineering center models based upon existing data and to create such models based upon simulated data to manage storm water presently and in the future.

A yet further object of the present invention is to provide decisionmakers of a jurisdiction with present and simulated scenarios for managing storm water commensurate with anticipated results and forecastable costs.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
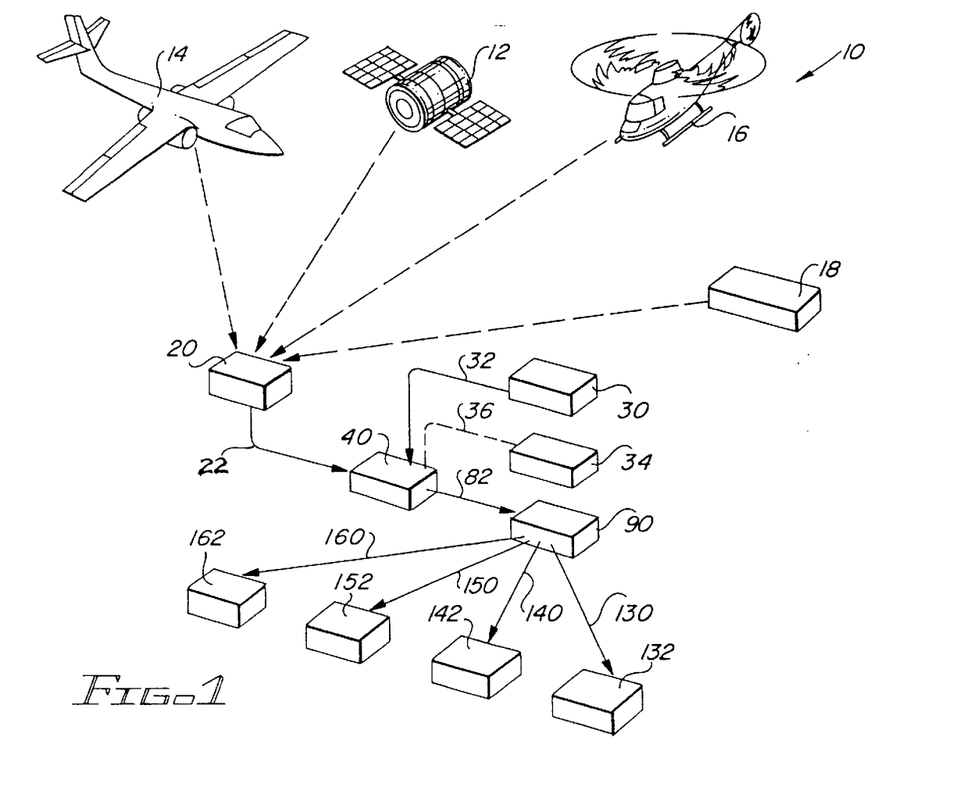
FIG. 1 is a block diagram schematically representing the information gathering and routing system.
Figure 2:
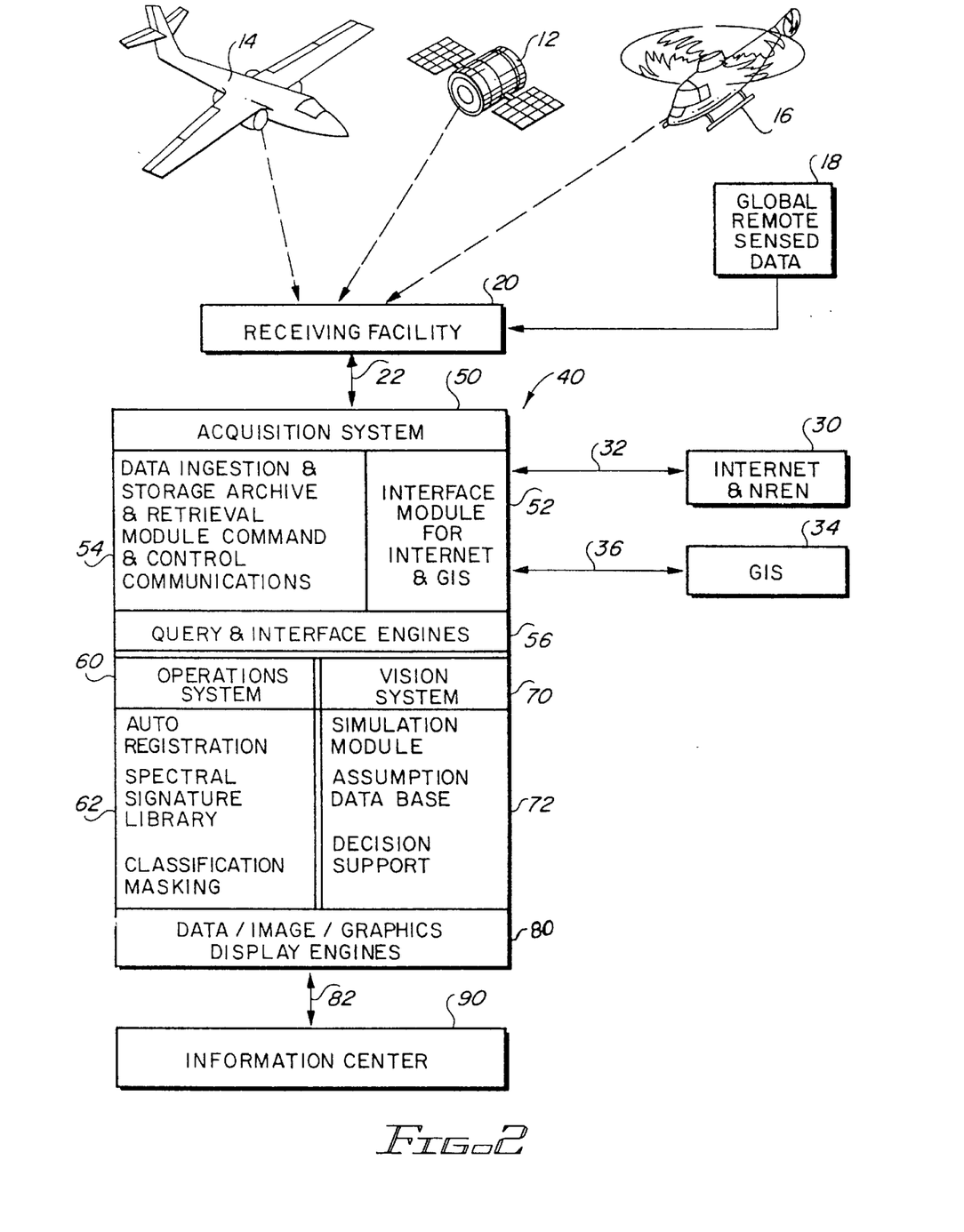
FIG. 2 is a block diagram depicting subsystems of the system shown in FIG. 1.

Referring to FIG. 1, there is shown a block diagram schematically illustrating an enhanced geographical information system 10. In particular, it illustrates the gathering of the information to be processed and the flow of the information after the gathering, including the processing and distribution of the information to ultimate users. FIG. 2 illustrates some of the hardware and software modules embodied in and broadly shown in FIG. 1. Information in any of various formats may be received by a data reception ground station 20 from several different sources. These sources may include an earth circling satellite 12, an aircraft 14, and a helicopter 16. The helicopter represents a local aircraft or an earth bound fixed sensor, such as a sensor atop a mountain or a tall building, etc., which gathers essentially local information. Aircraft 14 may be a type of reconnaissance aircraft that may cover a relatively large area for data gathering purposes. For example, aircraft 14 may provide multispectral radar, and lidar information, infrared data, photographs, and/or other information and helicopter 16 may provide primarily photographic and video information of a local area or some part or parts thereof. Satellite 12 may provide multispectral radar data, radar data, photographic information, infrared data, lidar data, sidar data and the like. There are many kinds or sources of data that are now available, and more types of sources of data will be available in the future, which are representatively depicted by satellite 12, aircraft 14, and helicopter 16. With contemporary technology, data from any of these sources may be transmitted to one or more earth stations 20.

With respect to terminology, it will be noted that multi-spectral data or information is generally considered as passive systems for deriving information. Radar, lidar, and sidar are typically considered active systems for deriving information from a transmitted signal reflected by an object of interest and received at a receiving station. Global remote sensed information/data, including global positioning system (GPS) and global climate change models, may be received by ground station 20. A block 18 represents the source(s) for such information/data.

The information/data gathered is transmitted from ground station 20 through appropriate transmission elements 22, such as wireless, fiberoptics, or cable elements to a central location 40. The central location includes the software and hardware necessary for processing the received information incorporated in three primary systems. These primary systems are an acquisition system 50, an operations system 60, and a vision system 70. The acquisition system includes an interface module 52 for receiving information from an Internet and a NREN station 30 through transmission line 32 and from GIS station 34 through transmission line 36. These stations provide regional and global information, respectively. The information available from Internet and NREN station 30 may come from any number of centers or sources. The data is transmitted to the interface module 52 from stations 30,34 by appropriate communications channels or transmission lines, as depicted.

Data may be received from numerous sources, as indicated above, such as from land based, airborne or space based sensor platforms, or from data libraries of various types. The data may be fed directly to central location 40 in real time or near real time. Remote sensed data, such as multi-spectral radar, lidar, and sidar, is routed to central location 40 where it is processed, manipulated, and archived. At the central station, data is routed to the appropriate hardware and software elements, as desired or required. The information represented by the data is analyzed, collated, and processed appropriately for use. The "use" may be multiple uses, depending on the users. That is, different users may desire different information, and the information is processed to provide single or multiple users with virtually any type of information from the data. The data may be retrieved, further manipulated, and presented through use of software and hardware elements in an interactive venue, such as might be designed for group decision support in a setting, such as an information center 90 illustrated in FIG. 3.

Three primary systems are integrated, as best shown in FIG. 2. One system is acquisition system 50, the second system is operations system 60, and the third system is vision or visioning system 70. Acquisition system 50 includes an interface module 52 which may interface with a generic geographic information system (GIS) station 34. Module 52 provides the interface software for subroutines with the generic GIS and the communications software for direct linkage with remote sensors. It may link continuously with several different sensor instruments on satellites or aircraft that provide selective hyperspectral scanning of the electromagnetic spectrum, radar imagery, which may be multi-polarized, and laser imagery (lidar), which may be similarly polarized. The module may then provide instantaneous or prerecorded information of value to the users. Initial processing of raw multi-spectral, real time data from aerial and space based platforms is performed within this module and it includes the hardware necessary to run the software and to facilitate data movement. After initial processing of the Internet and NREN data received from station 30 by interface module 52, the module communicates with a module 54 that provides various functions, such as data ingestion and storage, archive and retrieval, command and control, and communications relevant to the processed data.

Figure 3:
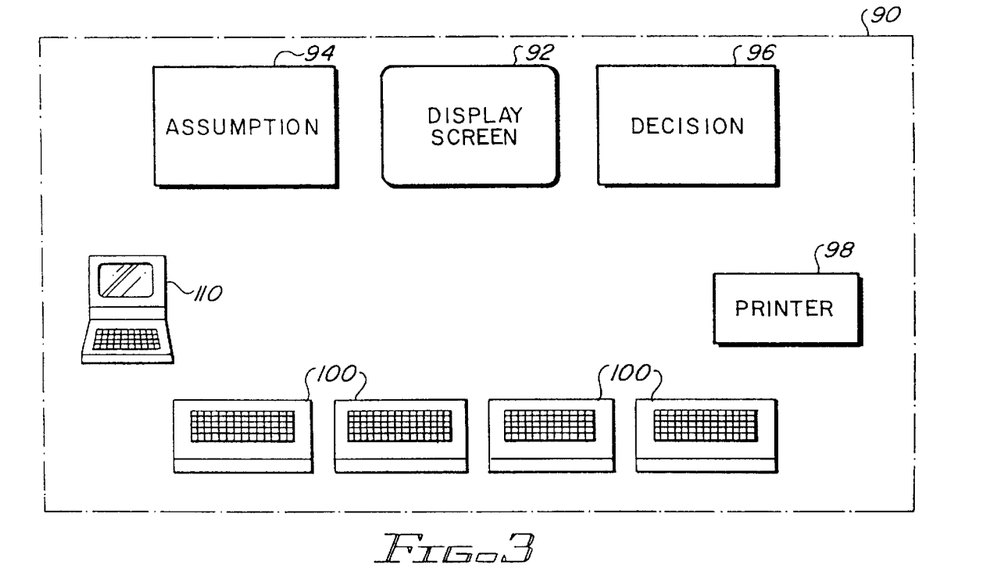
FIG. 3 is a block diagram illustrating an information center.

A plurality of direct display screens 92 may be used in information center 90 and controlled by interactive keyboards/LCD displays (consoles 100), as shown in FIG. 3. For example, a user may wish to see the aerial photography for a one mile buffer around a specific land address. The information is passed to the database query and interface engine 56 (FIG. 2) which locates the appropriate records. A unique identifier and task request is sent to block 80 wherein a graphics engine expands the geometry of the subject parcel of land for the one mile radius. Finally, the geometry of the buffer is passed to an image display engine and a data display engine which extracts only the portion of the image needed and sends the results on a transmission line 82 to a display screen 92 for display at information center 90.

Operations system 60 provides for remote sensed data transfer, manipulation, and display for current operations and user functions through software. Some of the functions include auto registration, spectral signature library, classification, and masking, as illustrated in block 62. The essential functions or sub modules for operations system 60, as listed in abbreviated form in block 62, include:

1. Automatic registration of multi-spectral, hyperspectral, radar, or lidar imagery:
    a) This module contains the subroutines necessary to automatically identify the data imagery type and to auto register, or align, this imagery or attribute information with the GIS database; and
    b) The GIS database provides known ground features to provide overall control points for rectification of the imagery. Only features with pronounced active or passive signatures, static physical characteristics and appropriate geographic locations will be identified, such as a canal, tree, vehicle, or building, etc. An algorithm then analyzes the imagery and matches the known ground control shapes, transferring the coordinate geometry of the GIS database features to the given image. This operation may be done through several correcting iterative processes by increasing the number of ground control features each time until an acceptable deviation is achieved.
2. High resolution multi-spectral, radar, and lidar imaging signature libraries:
    a) This library provides reference data for atmospheric, land surface, and subsurface features, vegetation, life forms, conditions, and attributes within any desired region, such as, for example, the southwestern United States region. This is a reference library for comparison with new remote sensed data, permitting feature identification, whether atmospheric, land surface, or subsurface;
    b) GIS registered, high resolution, multi spectral, and radar or lidar imagery is ground truthed and synthesized to build an optimal signature library. The imagery is superimposed with known features within the GIS database, such as pavement, roof tops, etc., to determine the most common signature return for the given feature;
    c) Since many factors can affect the signature return of any given feature, such as angle or pitch of the camera, shadows, etc., variances in the signature library occur. These variances are mathematically calculated to determine allowable tolerances within the signature band for each feature. Each spectral band within the spectral range for a given feature is examined for return values and optimally predictive values are calculated. This depicts the most common spectral return for the given band; and
    d) Next, tolerances are calculated by finding the minimum and maximum values in which a certain percentage of the returns for a given band belong. Finally, the signature library elements are tested and verified against or with known signatures for the region's known imagery to insure the classification accuracy of the data.
3. Classification module:
    a) This module interprets the data stream and is equipped to recognize atmospheric, surface, and subsurface constituent features and attributes by spectral signature or reflected image comparison with reference to the signature library discussed above.
4. Masking module:
    a) This module scans the data to produce an image which will present special features, such as a roof type or hydrant location, for example, and search for a given signature or indication, such as a particular pollutant, vegetation type, land characteristic, attribute, or object, or for a given coordinate set with a listing of selected attributes; and
    b) Following classification and/or masking, data are sent to the vision system or to an integrated user interface module, discussed below, for display and dissemination to a user. Data may be returned to vision system 70 repeatedly for additional processing, as desired. Geographical addressing, coordinate selection, attribute queuing, and zoom or magnification features are contained within this module.

General applications developed using vision system 70 include:
1. Environmental change monitoring, compliance, and enforcement;
2. Transportation monitoring, analysis, and planning;
3. General planning, growth assessment, and management;
4. Zoning and building code enforcement; and
5. Public protection and emergency/disaster response services.

Sample applications of this vision system include: hazardous materials dumping by type, location, and time; police (law enforcement) transit, service, utility, or other vehicle location and status; watershed status; impending weather related events; regionally coordinated disaster incident management; traffic vehicle counts by time of day and location; tracking of vehicles, biological and nonbiological objects, or other entities; transportation planning; zoning monitoring and enforcement; crime evidence gathering; development plan review and tracking; air quality analysis; sources and movement of pollutants; long term trends of various types; construction progress monitoring; and permit and other violations.

Visioning system 70 may provide dynamic visual and financial simulations of a region's future, given an assumption set and a predetermined series of development or policy decisions. It is intended to project into a long range time frame and incorporate global change data through a high speed data channel. Global data is regionalized, utilizing special subprogram software to combine emerging local climatic models with larger data sets. This subprogram accesses global environmental information data and modeling to assist a municipality in developing long term strategies which integrate with global environmental trends and emerging guidelines for sustainable development.

The following subroutines, depicted in block 72, are a part of vision system 70:
1. Simulation:
    a) Digital image manipulation and simulation capability utilizes advanced processing capabilities applied to environmental, economic, and social models developed as part of the module subroutines; and b) Optical image manipulation and simulation also utilizes advanced processing, but filters the image of elements not requiring update for the next image. An image library is established for a local community to use for fly through/bys and "what if" scenario generations.

2. Assumption Set and Database:
   Simulation scenarios derive from a set of assumptions, regarding, in part:
   a) Global/regional/local environmental factors (climate change, costs assigned to pollutants, new pollutants, totally internalized resource costs);
   b) Global/regional/local economic factors (rate of inflation, interest rates, sources of GNP and local incomes, new products and specification, existing material and product performance specifications, areas, tax rates); and
   c) Global/regional/local social, cultural, demographic factors (population forecasts, health costs, educational levels and provisions).

3. Decision Support Module:
   a) Simulation scenarios depend on the policy and development decisions made by a community, government, or user organization. These are categorized in this module to include likely outcomes for a variety of policies, development alternatives, and infrastructure projections with regard to cost, usage rates, and life cycle costing of materials.

This module includes group decision support software which may be user confidential and individually interactive at each user's console 100, (see FIG. 3), and at remote locations. A typical facility is depicted in FIG. 3 as information center 90 that may serve citizens, council commissions, senior management/planning meetings, etc. Obviously, this facility may be adapted to various user groups or organizations requiring the integration of multiple data sets, imagery, and group decision support software.

The entire system is appropriately interconnected, such as by fiber optics, to all appropriate user departments and offices to create a virtual network that integrates across user groups. As a national "Information Highway" is developed, the system may be connected to include other, or more, remote locations.

Information center 90 includes a plurality of interactive consoles 100 connected to the central location 40 by appropriate elements. A plurality of communications lines 130, 140, 150, and 160 are illustrated in FIG. 1 as extending to different centers 132, 142, 152, and 162, respectively, where the gathered and processed information may be used by users. One such user may be information center 90, connected to the central location 40 by an appropriate transmission line 82 from data/image/graphics display engines depicted in block 80. Block 80 represents the software and hardware which interfaces with the information center 90 and the central location 40. It will be understood that the various modules, engines, etc., within the central location 40 communicate with each other as required to analyze, retrieve, etc., the data as requested by users at consoles 100 . . . 106, etc.

At the front of the information center 90, and in front of the consoles 100, may be a large display screen 92. By use of the consoles 100, the users may call up and have displayed desired information on the display screen. Moreover, the information displayed on display screen 92 may be manipulated and otherwise used or varied as desired. A master control console or facilitator console 110 is shown in FIG. 3.

Some examples of the applications available are set out below. The examples are illustrative only, and not exclusive. Different users may sit at consoles 100. Facilitator console 110 may provide assistance for the users at the consoles. Hard copies of data may be provided by a plotter or printer 98 or similar image/data rendering device, or transmitted to a playback device for later usage, as desired.

On opposite sides of the display screen 92 are an assumption screen 94 and a decision screen 96. The purpose of these screens is to aid the users in making decisions based on provided data. The assumptions may include resource, pollutant costs as a minimum in arriving at proper decisions. Decision screen 96 will display the chosen decision tree, generally regarding changes to the natural environment. The display screen 92 will display visually and dynamically the long term results of the proposed changes.

Remote centers 132, 142, 152, and 162 are shown in FIG. 1. These remote centers may represent departments, agencies, private individuals or entities, schools and universities, federal agencies, other political units, etc., tied into or part of system 10.

The following examples set forth various and representative uses that may be accommodated by system 10:

EXAMPLE NO. 1

An "old" map shows water meters and sewer manholes at specific locations on a given street. With a hand held GPS transmitter, a person may walk along the street and activate the GPS transmitter at the water meters and manholes. GIS satellites receive the transmissions and relay the coordinates of the exact locations from where the transmissions were sent. The information is processed and is used to verify the "old" information and to correct any errors. The "new" information thus received and processed provides correct location information for the various water meter and sewer manholes.

EXAMPLE NO. 2

A new subdivision is planned for a section of land which includes hills, dry water courses and certain types of desired vegetation. The section of land has been photographed, etc., and the information is in the system memory. The information on the desired section is brought up on a computer screen and the information is analyzed. Appropriate printouts may be made for detailed analysis. The information provided includes details on the vegetation so that lot lines, roads, etc., may be plotted to have minimum adverse effect on the vegetation and on the natural water courses, etc.

EXAMPLE NO. 3

Aerial photographs of an area are processed with maps to show correct lot boundaries, misaligned walls and fences, and other desired information.

EXAMPLE NO. 4

Radar imagery is preprocessed and auto registered to a GIS mapping system which overlays parcel property lines. The resulting image can be automatically interpreted or "read" to determine the surface area and percent slope on any given ownership parcel. This yields buildable/unbuildable percentages and ultimately derives a slope analysis for the parcel. These parcels, and their attributes, can be aggregated to provide a basis for transaction negotiations, tax assessment, and other values which are slope dependent. The radar data provides highly accurate elevation data from the which the slope composite imagery is constructed.

EXAMPLE NO. 5

An agency responsible for reviewing, revising, approving, monitoring construction progress, and otherwise dealing with land use and architectural plans may require these to be submitted in computer assisted design (CAD) format on magnetic or optical media. Plans thus digitized may be merged into the GIS resident, remote sensed imagery to create dynamic, three-dimensional and realistic presentations of the finished development of a capital improvement project. The simulation software merges the digitized plan with change models and simulates visually how the project will look in the distant future. Plan check submodules approve, or disapprove the project based on its long term impacts as determined by this simulation capability.

EXAMPLE NO. 6

The visual simulations set forth in Example 5, above, may be integrated with economic, social, and environmental cost forecasts to determine a project's impact on the sustainability of the community, or ability to function without negatively impacting the future wellbeing of the community.

EXAMPLE NO. 7

A developer's plans are submitted on electronic optical or magnetic media and integrated with existing regulatory data and video of the proposed area to 1) verify plan compliance with city/state/federal codes, and 2) simulate how the proposed project, if built, would appear and impact the community in the distant future.

EXAMPLE NO. 8

City planners utilize the system to design and update the city's land use plan. Transportation planners, storm water planners, etc., will visualize the land use plan concurrently during the design phase and assess impacts of the plan with regard to transportation, storm water, etc. Recommendations and manipulations can be made by the transportation planner and the impact of such recommendations and manipulations can be visualized in three-dimensions. This process allows for group interaction in city planning through the integration of existing city models and the visualization of model inputs and outputs.

Figure 4:
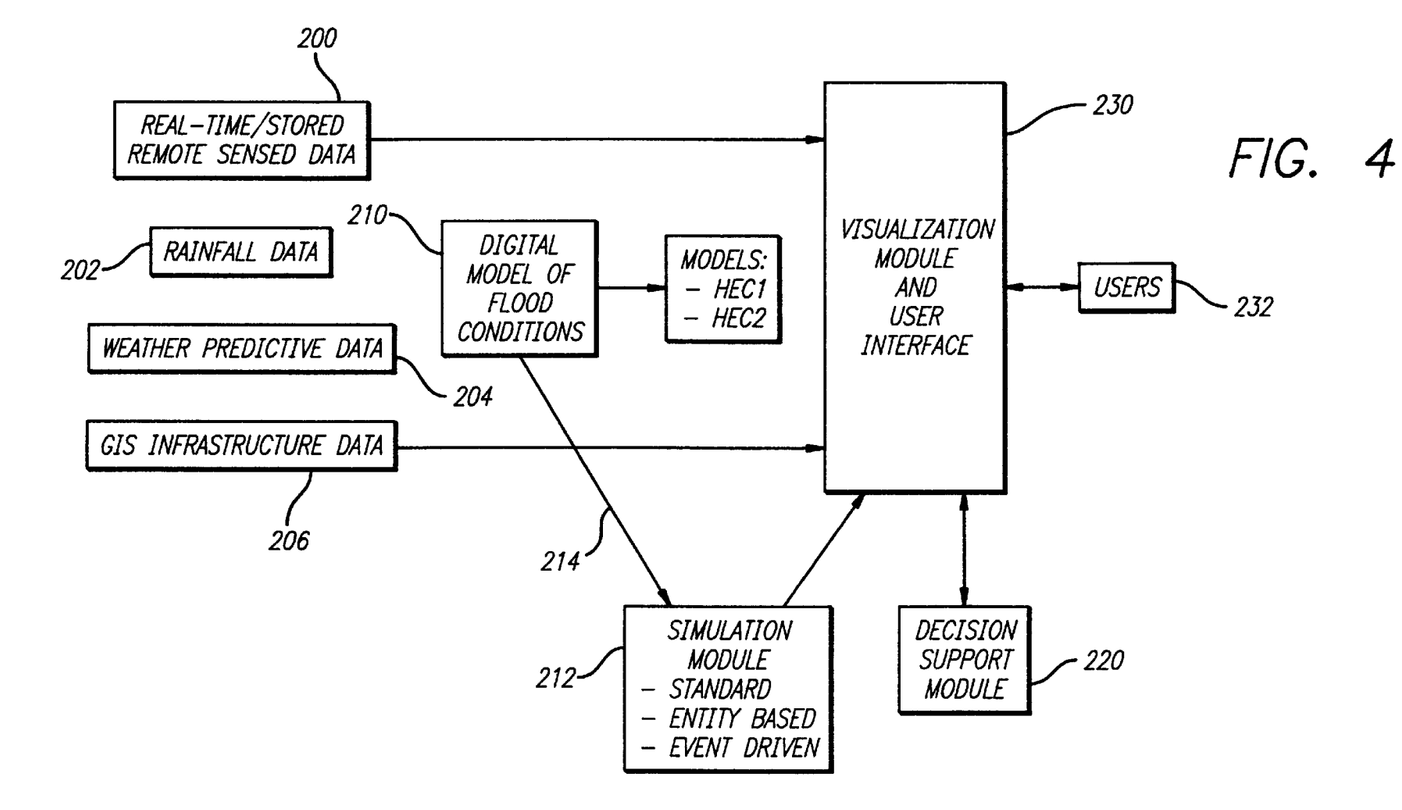
FIG. 4 illustrates a block diagram of data input and manipulation of the data to provide a basis for managing storm water under present and simulated future conditions.

Referring to FIG. 4, there is shown a block diagram depicting a method for managing storm water for a given area. Block 200 represents real time/stored remote sensed data, which data may have been collected, as described above in conjunction with FIGS. 1 and 2. In particular, this data will define water permeability of the surfaces of interest, the slope, roughness and other characteristics of the surface which will have an effect upon the rainfall runoff rate and volume. Block 202 contains rainfall data. This data may be manually acquired through observation or measurement. It may also be acquired automatically through use of stream gauges providing information on flow rate, depth, and width of each stream of interest. Other instrumentation may also be incorporated to provide further information, including temperature when such temperature may be a factor. The amount and extent of instrumentation along the streams of interest are selectable and a function of budgetary considerations. Additionally, real time data based upon observation or manual rainfall measurement may be included and inputted manually.

Block 204 includes weather predictive data based upon historical weather patterns, cause and effect trial runs conducted, simulations or other approximations of varying rainfall amounts and rainfall patterns. This data is manually inputted as it is based primarily upon judgment and prediction.

Block 206 includes geographical information system (GIS) infrastructure data. This data may be automatically collected and accumulated, as described above or may be inputted manually. The data of primary interest relates to land use and the type of cover present. This data can be manipulated to provide a comparative model between unknown and known land parcels to reduce uncertainties and enhance the accuracy of predictions made. A digital model of flood conditions (DMFC) model 210 provides interpretation of data received to preprocess the data for use in hydrological engineering center models (HEC1, HEC2). The DMFC module will also contain digital elevation models for the storm water basins under consideration or have such information available through related interconnections. Module 210 is interconnected with simulation model 212 through communication line 214 to provide data to the simulation model. The simulation module provides a variety of flood and damage scenarios based upon the severity of a rainfall event and the extent of flood control infrastructure present. For any given scenario, the flood control infrastructure present may be varied as a function of fiscal investment with or without defining the type or nature of such structures. For each scenario, a predicted degree or amount of damage is provided. To provide a multiplicity of scenarios, the module includes software providing selected infinitely variable degrees of rainfall, investment, and damage. With such possible infinitely variable scenarios, decisionmakers can determine the extent of investment necessary to provide an acceptable degree of damage for a given rainfall amount.

A Decision Support Model (DSM) 220 provides assistance to decisionmakers by using interactive computer terminals. This module permits an individual(s) to select topics or geographic areas of concern, assign a ranking to each, select levels of funding, project an extent of flooding, determine financial costs, etc. This plurality of selectable inputs will be combined by DSM module 220 for presentation of a visually perceivable image. This image may be reviewed by decisionmakers or support staff (users 232) to determine areas of major agreement and dissent. Any recommendations, comments, accords and discords voiced may be recorded with the DSM module. Thereby, issues can be identified, recommendations can be made, a vote can be conducted to resolve differences of opinion and a final decision may be made. A multiplicity of screens may be used in conjunction with visualization module 230 to simultaneously present different visually perceivable images to better understand the consequences and benefits of a decision made or to be made on any given actual or simulated data set.

Figure 5:
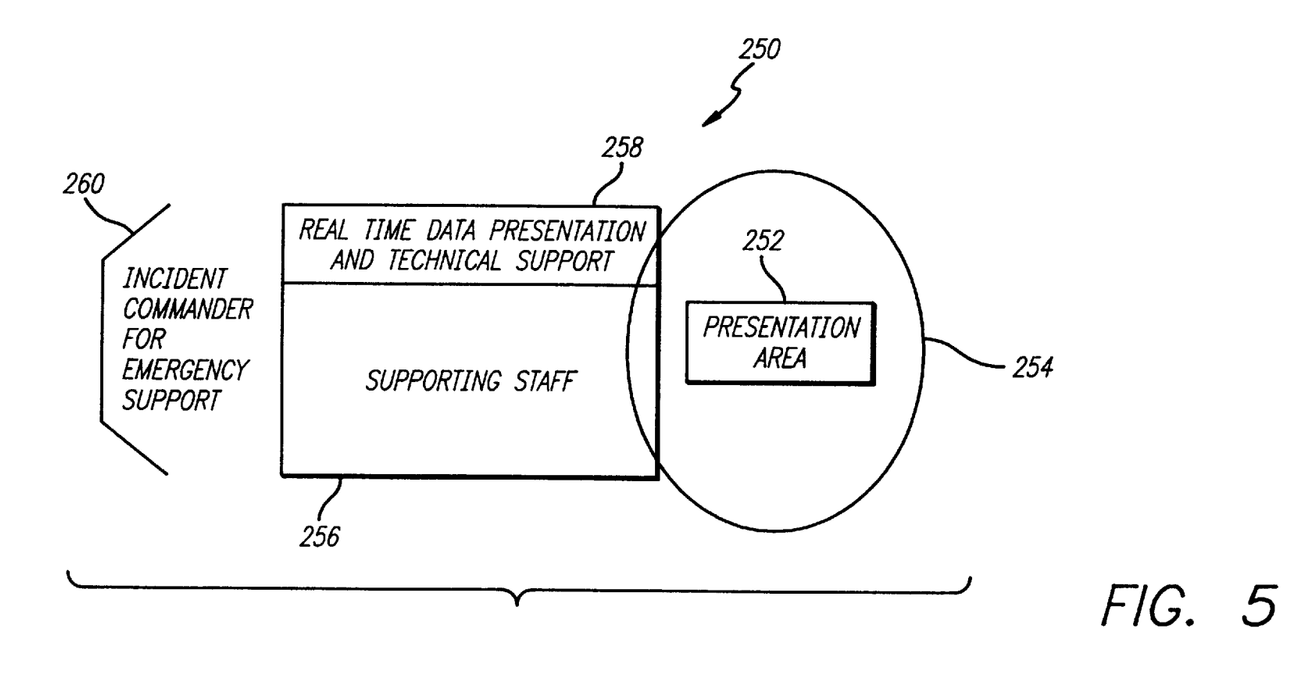
FIG. 5 illustrates a representative setting for reviewing, discussing, and approving a plan for managing storm water.

Referring to FIG. 5, there is illustrated a facility 250 similar to information center 90 (shown in FIG. 3) for presenting one or more models for managing storm water at a locality of interest. The facility includes a presentation area 252 incorporating screens to provide images depicting the flow and course of storm water at the location of interest. A stage 254 or the like may be included for speakers or other presenters of information. An area designated 256 may be used for staff who provide a supporting role within their particular areas of expertise. A console 258 or the like may be incorporated for providing selected real time data and technical support relating to the information presented. During emergencies or in anticipation of emergencies, decisionmakers or a commander in charge at the time of an emergency and his/her adjutants may be placed in an area designated 260 to oversee presentations that may be real time and presentations of projected impact of a storm water emergency. Such personnel would have access to technical support from console 258 and from the supporting staff in area 256 to obtain information for making decisions and to implement the decisions made.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for creating a model to manage storm water at a minimum cost to achieve an acceptable level of risk of loss of life and of property damage by presenting documentation or visually perceivable images for various scenarios based on rainfall, ground and surface related data and costs, said method comprising the steps of:
   (a) acquiring factual natural and man-made storm water management information on a real time basis;
   (b) identifying subject matter of the real time factual information;
   (c) ingesting and storing the identified factual information;
   (d) retrieving pre-existing factual storm water management information of selected subject matter from a source;
   (e) correlating selected ingested information with corresponding retrieved information;
   (f) compiling the correlated information into the model for storm water management;
   (g) analyzing the compiled information to obtain simulation scenarios of the impact upon the model due to either actual or anticipated variations of the factual information; and
   (h) selectively presenting the compiled or analyzed model for review and study.

2. The method as set forth in claim 1 including the step of deleting any retrieved information commensurate with any ingested information to render most current the correlated information.

3. The method as set forth in claim 1 including the step of simulating the model in at least one future time period based upon the ingested and the retrieved information.

4. The method as set forth in claim 1 wherein said step of retrieving includes the step of using the retrieved storm water management information and the ingested information to develop simulated storm water management information in a predetermined time period.

5. The method as set forth in claim 1 wherein said step of presenting includes the step of imaging a selected one of the compiled information and the simulation scenarios in a visually perceivable format.

6. The method as set forth in claim 1 wherein said step of presenting includes the step of displaying the compiled information in more than one format.

7. The method as set forth in claim 1 wherein said step of correlating includes the step of creating different combinations of the ingested information and the retrieved information and wherein said step of compiling produces a plurality of compilations of information.

8. The method as set forth in claim 7 wherein said step of presenting includes presentation of the plurality of compilations.

9. The method as set forth in claim 1 wherein said step of presenting includes the step of displaying the projections resulting from said step of analyzing.

10. The method as set forth in claim 9 wherein said step of displaying includes the step of displaying the projections in more than one format.

11. The method as set forth in claim 1 including the step of simulating the effect upon the compiled information as a result of varying the factual information.

12. A method for collecting natural and man-made information and presenting a model for storm water management, said method comprising the steps of:
   (a) acquiring factual natural and man-made storm water management information on a real time basis;
   (b) identifying subject matter of the real time factual information;
   (c) retrieving pre-existing factual storm water management information of selected subject matter from a source;
   (d) correlating selected identified information with corresponding retrieved information;
   (e) analyzing the correlated information to obtain simulation scenarios of the impact upon the factual information due to either actual or anticipated future variations of factual information; and
   (f) selectively presenting the correlated and analyzed information as part of the model.

13. The method as set forth in claim 12 wherein said step of correlating includes the step of replacing the retrieved information with corresponding acquired information to present up-to-date factual information.

14. The method as set forth in claim 12 wherein said step of correlating includes the step of compiling the correlated information in more than one time period.

15. The method as set forth in claim 13 wherein said step of correlating includes the step of compiling the correlated information in more than one time period.

16. The method as set forth in claim 12 wherein said step of presenting includes the step of imaging a selected one of the correlated information and the simulation scenarios in a visually perceivable format.

17. The method as set forth in claim 12 wherein said step of presenting includes the step of displaying the correlated information.

18. The method as set forth in claim 12 wherein said step of presenting includes the step of displaying the projections resulting from said step of analyzing.

19. The method as set forth in claim 18 wherein said step of displaying includes the step of displaying the projections in more than one format.

20. The method as set forth in claim 12 including the step of simulating the effect upon the correlated information as a result of varying the factual information.

21. A method for creating a model for managing storm water from varying collected natural and man-made storm water management information, said method comprising the steps of:
   (a) acquiring factual natural and man-made storm water management information on a real time basis;
   (b) identifying subject matter of the real time factual information;
   (c) ingesting and storing the identified factual information;
   (d) retrieving pre-existing factual storm water management information of selected subject matter from a source;

(e) correlating selected ingested information with corresponding retrieved information;

(f) varying selected parameters of the ingested factual information;

(g) compiling the correlated information and the varied information;

(h) analyzing the compiled information to obtain simulation scenarios for the model of the impact resulting from the selected variations of the factual information; and (i) presenting the analyzed simulation scenarios of the model for review and study.

22. A method for projecting the effect on a model for managing storm water resulting from varying collected natural and man-made storm water management information, said method comprising the steps of:

(a) acquiring factual natural and man-made storm water management information on a real time basis;

(b) identifying subject matter of the real time factual information;

(c) ingesting and storing the identified factual information;

(d) retrieving pre-existing factual storm water management information of selected subject matter from a source;

(e) correlating selected ingested information with corresponding retrieved information;

(f) varying selected parameters of the acquired factual information;

(g) compiling into the model the correlated information and the varied information;

(h) analyzing the compiled information of the model to obtain simulation scenarios of the impact resulting from the selected variations of the factual information; and (i) presenting the analyzed simulation scenarios of the model for review and study.

23. A method for projecting the effect on a model for managing storm water resulting from varying collected natural and man-made storm water management information, said method comprising the steps of:

(a) acquiring factual natural and man-made storm water management information on a real time basis;

(b) retrieving pre-existing factual storm water management information of selected subject matter from a source;

(c) correlating selected identified information with corresponding retrieved information;

(d) varying selected parameters of the retrieved factual information;

(e) analyzing the correlated information to obtain simulation scenarios of the impact resulting from the selected variations of factual information; and (f) presenting the analyzed simulation scenarios of the model.

24. A method for projecting the effect on a model for managing storm water resulting from varying collected natural and man-made storm water management information, said method comprising the steps of:

(a) acquiring factual natural and man-made storm water management information on a real time basis;

(b) retrieving pre-existing factual storm water management information of selected subject matter from a source;

(c) correlating selected identified information with corresponding retrieved information;

(d) varying selected parameters of the acquired factual information;

(e) analyzing the correlated information to obtain simulation scenarios of the impact upon the model resulting from the selected variations of factual information; and (f) presenting the analyzed simulation scenarios of the model.

* * * * *